O. M. OTTE.
GOGGLES.
APPLICATION FILED MAR. 3, 1916.
1,206,133.
Patented Nov. 28, 1916.
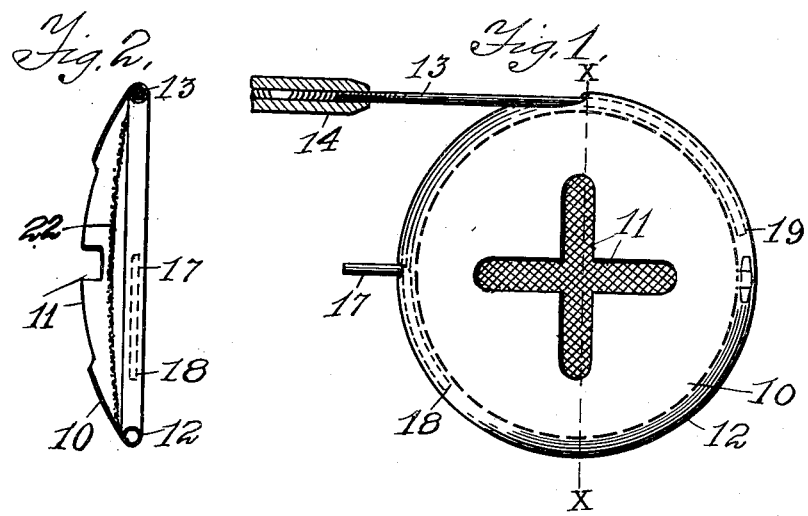
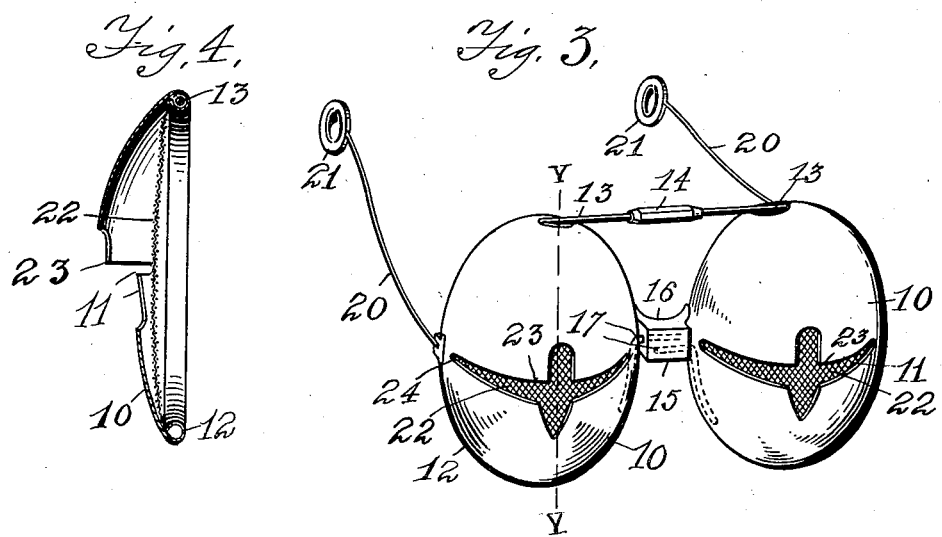
Witnesses
C. O. Hultgren
H. A. Sandberg
Inventor
Otho M. Otte
By S. Arthur Baldwin
Attorney

UNITED STATES PATENT OFFICE.

OTHO M. OTTE, OF JAMESTOWN, NEW YORK.

GOGGLES.

1,206,133.

Specification of Letters Patent.　　Patented Nov. 28, 1916.

Application filed March 3, 1916.　Serial No. 81,830.

*To all whom it may concern:*

Be it known that I, OTHO M. OTTE, a citizen of the United States, residing at the city of Jamestown, in the county of Chautauqua and State of New York, have invented certain new and useful Improvements in Goggles, of which the following, taken in connection with the accompanying drawings, is a specification.

The invention relates to goggles for shielding the eyes of the driver of motor cars and other persons whose eyes are exposed to bright lights, particularly from the rays of the sun and brilliantly reflected headlights in the night time, to thereby overcome the blinding of the eyes; and the improvement consists in providing a slotted sheet metal disk or goggle which gives the central line of vision and provides vertical and lateral vision fields from said line of vision while protecting the eyes, also shading the eyes of the user from the rays of the sun; and the invention consists in the novel features and combinations hereinafter set forth and claimed.

In the drawings, Figure 1 is a front elevation of one of the sheet metal disks or goggles showing the slotted openings therein in the form of a cross centering at the line of vision and the arms extending out therefrom; and Fig. 2 is a sectional view at line X X in Fig. 1 of said disks or goggles showing the preferred concave form and the fine screen within said concave disks to further assist in the protection of the eyes of the driver. Fig. 3 is a perspective view of a pair of goggles with adjustable frames for adjusting the distance therebetween to adjust to the centers of vision of the user and having concave sheet metal or other opaque sheet substance which can be stamped out and shaped by means of suitable dies and having the lateral and vertical vision fields; and Fig. 4 is a sectional view at line Y—Y in Fig. 3 showing a modification of the shape of the concave sheet metal disk, the top overhanging the lower half and forming a canopy shield from overhead light as in bright sun light.

Like characters of reference refer to corresponding parts in the several views.

The numeral 10 designates the concave sheet metal or other material limited vision disks or goggles which have the horizontal and vertical openings 11 therein centering at the central line of vision.

The outer edges or rims 12 of the disks 10 are turned in tubular form to give added stiffness and strength to the disks 10 around their periphery and also to receive the curved ends 19 of the connecting wires 13 therein, which are threaded on their exposed ends with right and left threads and connected by a sleeve coupling 14, thereby forming a turnbuckle to adjust the space between the disks 10.

The nose piece or block 15 comprises a piece of metal or other suitable material having a curved inner surface 16 to fit the bridge of the nose and having holes in the opposite sides to slidably receive the projecting wires 17 on the rims 12, which wires 17 are placed one in each of the rims 12 so as to extend out in vertical line with one another, that is one above the other, to slidably engage the holes in the block 15, said wires 17 supporting said block 15.

The curved end 18 of the wire within the tubular rim 12 extends at the same curve as said rim a sufficient distance within the rim 12 to be firmly held by the sheet metal forming said tubular rim 12, the sheet metal being pressed down in suitable dies so firmly upon the ends 18 and 19 of the wires 13 and 17 that said wires are held firmly in position without solder or other attachment within the tubular rim 12, though to solder them would not depart from my invention.

A pair of bows 20 are provided for holding the disks 10 in position and are preferably of the temple grip form having the disks 21 at their ends to grip the opposite sides of the temple of the user, though the hook form of bows may be used.

The disks 10 are preferably made in the concave or outwardly curved form shown in Figs. 1 and 2 for use by most wearers. A fine woven wire screen 22 is provided within the concave disk 10, being attached around the eyes within the tubular edge 12 and protecting the eyes of the wearer from the dust or other foreign and injurious matter.

A modification of the oval form shown in Figs. 1 and 2 is shown in Figs. 3 and 4 in which the upper half 23 overhangs the lower half forming a canopy or shield from overhead light as, for example, the bright sun light.

A form of the opening 11 is shown in the modification in Fig. 3 in which the outer ends of the arms 24 of the crosswise opening are greatly diminished, the jutting canopy permitting this narrowing of the slot giving a larger opening for the eye because of said canopy top 23.

I claim as new:

1. A goggle comprising a sheet metal concave disk, the edge of said disk turned in tubular form to strengthen the same, said concave disk having a slotted vision opening therein.

2. A goggle comprising a concave sheet metal disk having a cross-shaped opening therein across the center of vision, the outer ends of the arms of said cross-shaped opening diminished in size.

3. A goggle comprising a sheet metal concave disk, the edge of said disk turned in tubular form, said concave disk having a slotted opening therein for the vision, and a screen disk attached in said tubular edge within said concave disk to protect the eye.

4. A goggle comprising a sheet metal disk having a horizontal slot therein for the line of vision, the upper portion of said disk extending out over the lower portion of said disk, and the edge of said disk turned in tubular form to stiffen the same.

5. A goggle comprising a sheet metal concave disk having a vertical and horizontal slot therein crosswise of the line of vision, the upper portion of said concave disk extending out over the lower portion of said concave disk, the rim of said concave disk turned in tubular form to stiffen the same, and a disk-shaped wire screen attached in said tubular edge within said concave disk to protect the eye.

6. A pair of goggles comprising sheet metal concave disks having cross-shaped openings therein across the line of vision, the edges of said disks turned in tubular form to stiffen the same, said edges having openings therein to receive connective wires in attaching engagement, a turnbuckle on said connective wires, and a suitable nose piece and bows on said goggles.

In testimony whereof I have affixed my signature in the presence of two witnesses.

OTHO M. OTTE.

Witnesses:
H. A. Sandberg,
C. O. Hultgren.